United States Patent
Rosch et al.

[19]

[11] Patent Number: 6,163,884
[45] Date of Patent: *Dec. 26, 2000

[54] ELASTICIZED TOP GARMENT

[75] Inventors: Paulette Mary Rosch, Sherwood; Ingrid Christine Hollrah, Neenah; Mark Louis Robinson, Appleton, all of Wis.

[73] Assignee: Kimberly-Clark Worldwide, Inc., Neenah, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/980,049

[22] Filed: Nov. 26, 1997

Related U.S. Application Data

[63] Continuation of application No. 08/442,436, May 16, 1995, Pat. No. 5,790,983.

[51] Int. Cl.[7] .................................................. A41D 27/00
[52] U.S. Cl. ............................................ 2/75; 2/69; 2/243.1
[58] Field of Search .......................... 2/1, 46, 48, 49.4, 2/50, 51, 69, 69.5, 70, 71, 72, 75, 80, 83, 90, 93, 94, 97, 104, 105, 106, 109, 110, 111, 113, 114, 115, 122, 129, 211, 243.1, 244

[56] References Cited

U.S. PATENT DOCUMENTS

| | | |
|---|---|---|
| 1,095,681 | 5/1914 | Smith . |
| 1,382,742 | 6/1921 | Platt ............................................. 2/67 |
| 1,669,868 | 5/1928 | Fagan . |
| 2,134,630 | 10/1938 | White . |
| 2,211,549 | 8/1940 | Semons . |
| 2,458,696 | 1/1949 | Elias . |
| 2,545,109 | 3/1951 | Roodner . |
| 2,553,863 | 5/1951 | Myron . |
| 2,598,622 | 5/1952 | Tolkin . |
| 2,760,202 | 8/1956 | Ethé . |
| 2,794,187 | 5/1957 | Edelman ..................................... 2/129 |
| 4,360,398 | 11/1982 | Sabee . |
| 4,413,623 | 11/1983 | Pieniak . |
| 4,600,605 | 7/1986 | Nakai et al. . |
| 4,606,964 | 8/1986 | Wideman . |
| 4,704,321 | 11/1987 | Zafiroglu . |
| 4,798,557 | 1/1989 | Scott . |
| 5,230,701 | 7/1993 | Meyer et al. . |
| 5,371,904 | 12/1994 | McEwen ..................................... 2/129 |
| 5,790,983 | 8/1998 | Rosch et al. . |

FOREIGN PATENT DOCUMENTS

| | | |
|---|---|---|
| 104363 | 7/1938 | Australia . |
| 220326 | 9/1957 | Australia . |
| 857467 | 9/1940 | France . |
| 963526 | 7/1950 | France . |
| 1368235 | 6/1963 | France . |
| 1066914 | 12/1964 | France . |
| 2350953 | 1/1978 | France . |
| 2690316 | 10/1993 | France . |
| 1925303 | 12/1970 | Germany . |
| 2248391 | 4/1973 | Germany . |
| 3238051 | 4/1984 | Germany . |
| 315968 | 12/1934 | Italy . |
| 61-201060A | 9/1986 | Japan . |
| 61-289163A | 12/1986 | Japan . |
| 62-121045A | 6/1987 | Japan . |
| 66833 | 4/1943 | Norway . |
| 70/3115 | 12/1970 | South Africa . |
| 107322 | 5/1943 | Sweden . |
| 208288 | 12/1923 | United Kingdom . |
| 441069 | 1/1936 | United Kingdom . |
| 486475 | 3/1937 | United Kingdom . |
| 476456 | 12/1937 | United Kingdom . |
| 812087 | 4/1959 | United Kingdom . |

*Primary Examiner*—Gloria M. Hale
*Attorney, Agent, or Firm*—Brinks Hofer Gilson & Lione

[57] ABSTRACT

A disposable girl's top including a elastic system which is under tension and a ruffle which forms an edge of the elastic structure whereby the curl up of the structure is minimized.

26 Claims, 6 Drawing Sheets

ELASTICIZED TOP GARMENT

This is a continuation of application Ser. No. 08/442,436, filed May 16, 1995, now U.S. Pat. No. 5,790,983.

BACKGROUND OF THE INVENTION

This invention pertains to elasticized top garments particularly, though not exclusively, intended for the use of bathers or swimmers and relates to the kind which are disposable and primarily for children.

Currently, disposable waste containment articles find widespread use in the areas of adult care, infant care, and child care, and have generally replaced reusable cloth articles. Disposable diapers, for example, have met a particular need and have become very popular. Disposable training pants have also met a particular need and have become popular. However, once a child desires to travel to a swimming pool or beach, the child requires a waste containment garment for possible "accidents" during such travel. As part of a disposable swim wear, a disposable girl's top is desired by the parent of the child.

In fitting the child, one form of girl's top is a fully elasticized structure which extends from just about the top of the arm pit to just above the girl's tummy and down to her waist. One problem in the fit of the elasticized material occurs when it has consisted of a bulked web composite such as described in U.S. Pat. No. 4,606,964. The top's bottom edge has a tendency to curl up and fold over. This creates a poor appearance and tends to ride up on the wearer.

SUMMARY OF THE INVENTION

Thus, there is a need to provide an improved child's swimming apparel that minimizes the bottom rollover tendency during wearing while maintaining proper coverage. In response to this need, an improved elasticized top has been discovered.

A garment for wearing about the body comprises a body-covering assembly having an upper body opening and a lower body opening, each opening having an edge about its perimeter, the body covering assembly comprising a relatively elastic region, between the upper edge and a lower edge region, and a lower edge region between the relatively elastic region and the lower edge, the lower edge region being relatively inelastic compared to the relatively elastic region; the lower edge region further being from about 0.25 to about 2.0 inches in width.

Numerous features and advantages of the present invention will appear from the following description. In the description, reference is made to the accompanying drawings which illustrate preferred embodiments of the invention. Such embodiments do not represent the full scope of the invention. Reference should therefore be made to the claims herein for interpreting the full scope of the invention.

BRIEF DESCRIPTION OF THE DRAWINGS

The above-mentioned and other features of the present invention and the manner of attaining them will become more apparent, and the invention itself will be better understood by reference to the following description of the invention, taken in conjunction with the accompanying drawings, wherein.

DEFINITIONS

Figure 1:
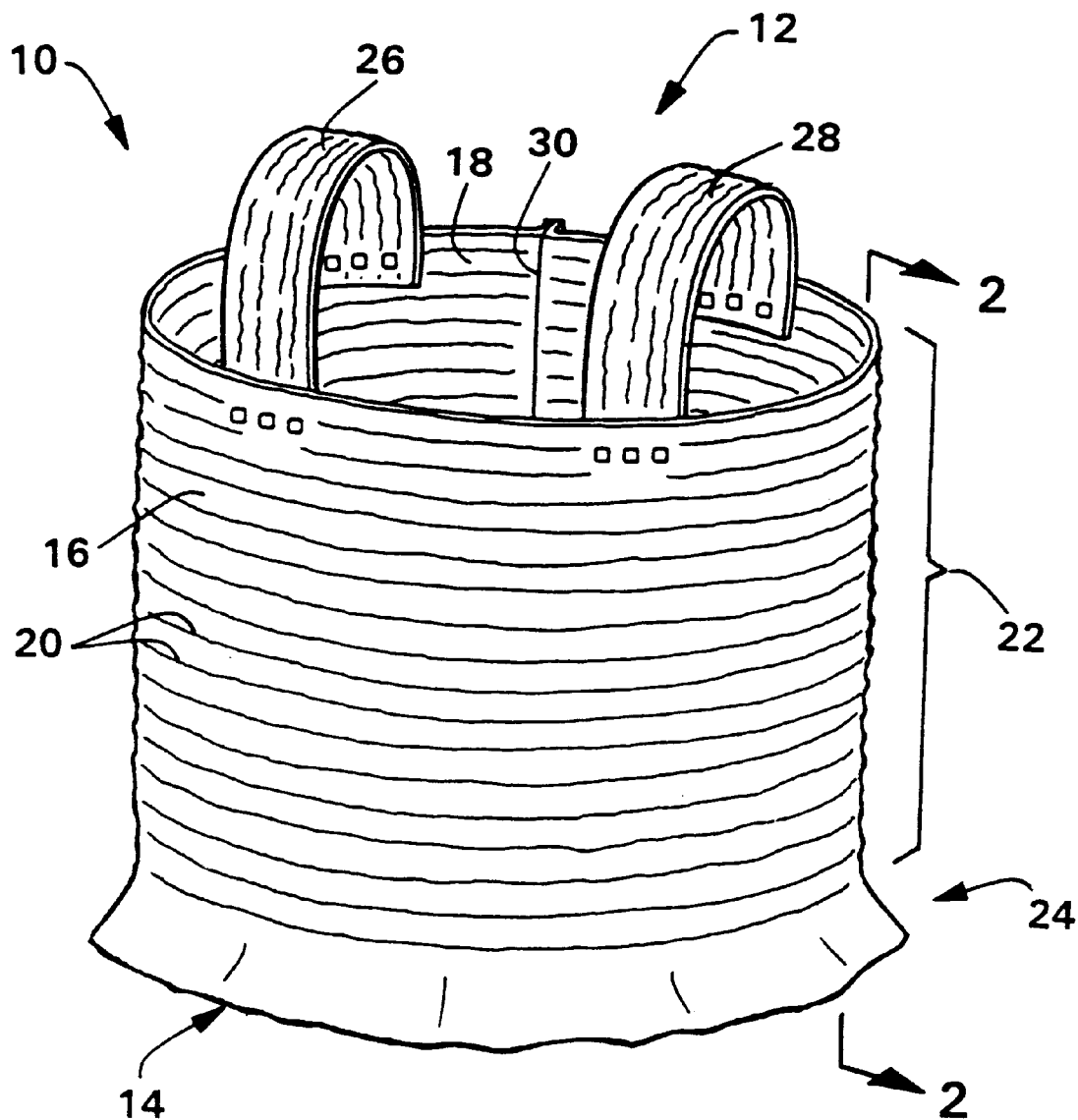
FIG. 1 is a front view of a girl's top typifying an embodiment of the present invention for a girl's swimsuit.

Within the context of this specification, each term or phrase below will include the following meaning or meanings:

(a) "Bonded" refers to the joining, adhering, connecting, attaching, or the like, of two elements. Two elements will be considered to be bonded together when they are bonded directly to one another or indirectly to one another, such as when each is directly bonded to intermediate elements.

(b) "Disposable" includes being disposed of after use, and not intended to be washed and reused.

(c) "Disposed", "disposed on", "disposed with", "disposed at", "disposed near", and variations thereof are intended to mean that one element can be integral or unitary with another element, or that one element can be a separate structure joined to or connected to or placed with or placed near another element.

(d) "Elasticity" and "elastic" include that property of a material by virtue of which it tends to substantially recover to its original size and shape after removal of a force causing deformation of the material.

(e) "Elastically connected" and "elastically connecting" refer to two elements being separated by and bonded to an elastic member, where the relative position of the two elements may change due to extension of the elastic member.

(f) "Elongation" includes the ratio of the extension of a material to the length of a material prior to the extension. Elongation is expressed in percent.

(g) "Extension", "extend", and "extended" include the change in length of a material due to stretching. Extension is expressed in units of length.

(h) "Force" includes a physical influence exerted by one body on another which produces acceleration of bodies that are free to move and deformation of bodies that are not free to move. Force is expressed in grams-force.

(i) "Foreshortened" and "foreshortening" include to shorten beforehand, that is, before a subsequent step.

(j) "Front" and "back" are used to designate relationships relative to the garment itself, rather than to suggest any position the garment assumes when it is positioned on a wearer.

(k) "Gatherable" material is one which, when bonded to the reticular web with the latter is under is under tension, will gather, with the formation of puckers or gathers, to accommodate contraction of the reticulated web upon release of the tensioning forces.

(l) "Member" when used in the singular can have the dual meaning of a single element or a plurality of elements.

(m) "Operatively joined" with reference to the attachment of an elastic member to another element means that the elastic member when attached to or connected to or treated with heat with the element gives that element elastic properties. With reference to the attachment of a non-elastic member to another element, it means that the member and element can be attached in any suitable manner that permits or allows them to perform the intended or described function of the joinder. The joining, attaching, connecting or the like can be either directly, such as joining either member directly to an element, or can be indirectly by means of another member or element disposed between the first member and the first element.

(n) "Ruffles" includes the region of the material which lies outside the outermost elastic and includes no elastic material. That is, no elastic material present or the elastic material which was present has been rendered inelastic.

(o) "Rupture" includes the breaking or tearing apart of a material. In tensile testing, rupture refers to the total separation of a material into two parts, either all at once or in stages, or the development of a hole in some materials.

(p) "Stretch bonded" refers to an elastomeric strand being bonded to another member while the elastomeric strand is elongated at least about 25 percent of its relaxed length. Desirably, the term "stretch bonded" refers to the situation wherein the elastomeric strand is elongated at least about 50 percent, more desirably at least about 300 percent, of its relaxed length when it is bonded to the other member.

(q) "Stretch bonded laminate" ("SBL") refers to a composite material having at least two layers in which one layer is a gatherable layer and the other layer is a stretchable, that is, elastic, layer. The layers are joined together when the stretchable layer is in a stretched condition so that upon relaxing the layers, the gatherable layer is gathered.

(r) "Tension" includes a uniaxial force tending to cause the extension of a body or the balancing force within that body resisting the extension.

(s) "Two-dimensional" refers to a garment, such as a diaper, that can be opened and laid in a flat condition without destructively tearing any structure. This type of garment does not have continuous leg and waist openings when opened and laid flat, and requires a fastening device, such as adhesive tapes, to attach the garment about the wearer.

(t) "Three-dimensional" refers to a finished garment similar to shorts or pants in that they have continuous leg and waist openings that are bounded by the material of which the garment is made. This type of garment can be opened and laid flat only by destructively tearing it. This type of garment may or may not have manually tearable seams.

(u) "Ultimate elongation" includes the elongation at the point of rupture.

These definitions are not intended to be limiting and these terms may be defined with additional language in the remaining portion of the specification.

DESCRIPTION OF A PREFERRED EMBODIMENT

Figure 2:
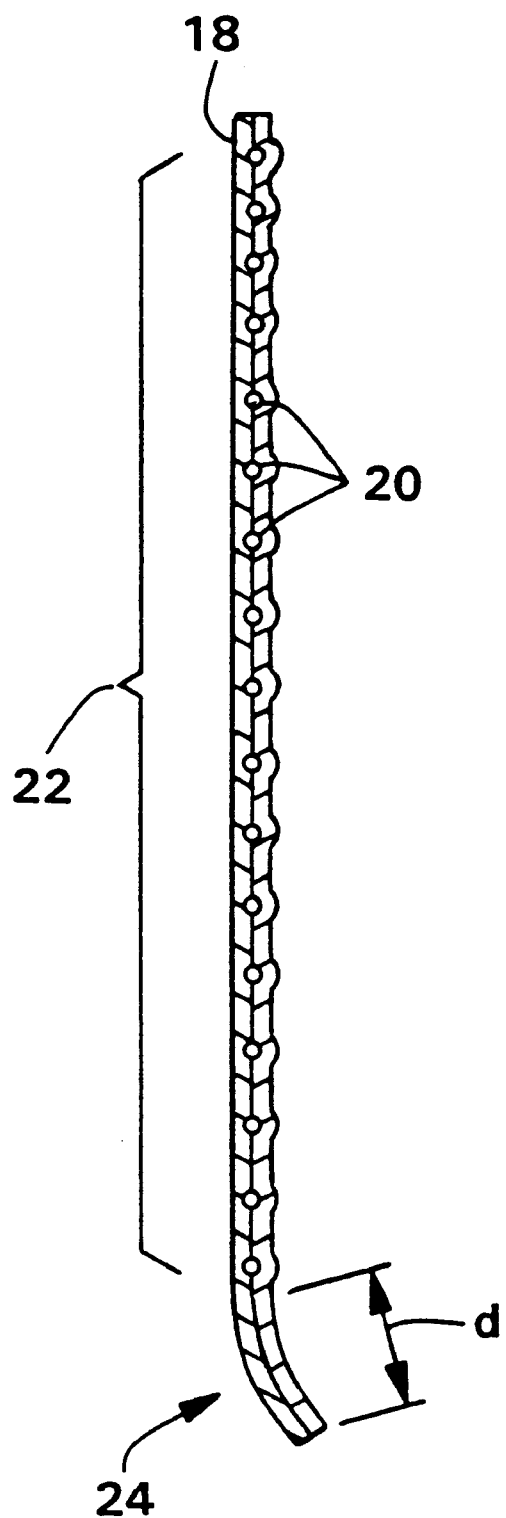
FIG. 2 is a cross-sectional view of FIG. 1 taken along line 2—2 and viewed in the direction of the arrows.
Figure 3:
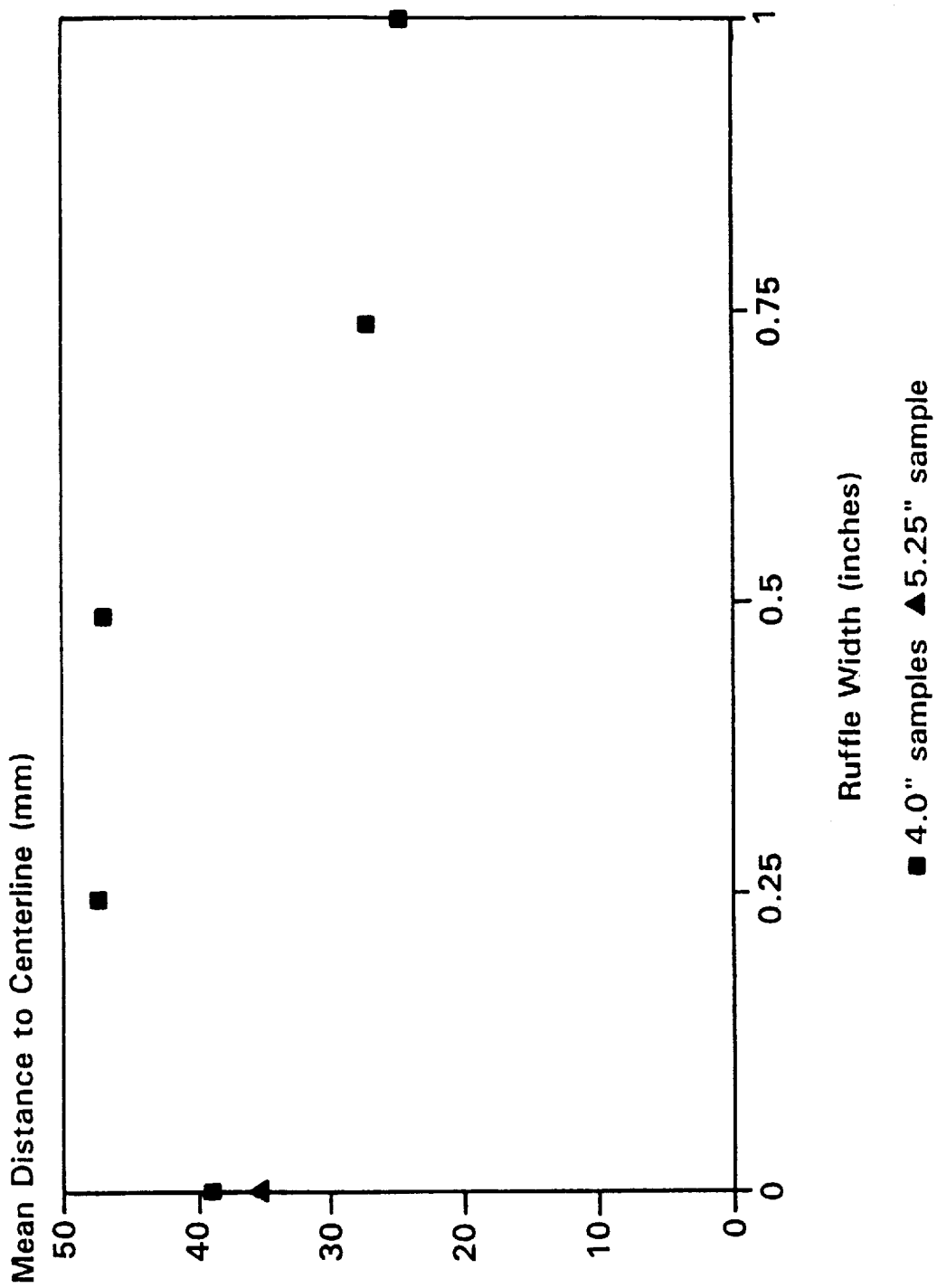
FIG. 3 is a chart showing curl over for no ruffle and 25% stretch.

Referring to FIGS. 1 and 2, a garment for wearing about the body comprising an elastic top 10 having an upper body opening 12 and a lower body opening 14, each opening having an edge about its perimeter, the top 10 comprising an outer cover 16 and body side liner 18 both of which generally cover a series of body elastics 20.

The body elastics 20 circumferentially surround the body to form a relatively elastic region 22 of the top 10. The elastics 20 act independently to conform to the contours of various body types and builds. This provides a smooth, snug, and comfortable fit within a given chest size range. About the lower body opening 14, below and adjacent the relatively elastic region 22, there is formed at the lower edge a relatively inelastic region 24.

In a top 10 intended for a 25 pound girl, the body elastics 20 are about 16 inches (406 mm) long unstretched. For a top 10 that does not cover the girl's stomach, the height of the top 10 is about 5.75 inches (146 mm) wide.

For a top that does cover to the waist the height may be about 9.00 inches (229 mm) wide. If it does extend to the waist, the top 10 may be fastened to the bottom or pant garment. Optionally, the top 10 may include a pair of straps 26 and 28 which will help hold the garment in place.

The lower edge region "d" (see FIG. 2) is from about 0.25 to about 2.0 inches in width, preferably about 1.0 inch in width.

Both outer cover 16 and body side liner 18 are compliant and soft feeling to the wearer. The following description of materials from which the outer cover 16 can be made applies equally to the material of the body side liner 18.

The outer cover 16 may be any suitable gatherable material, such as a woven material, a nonwoven material, a fibrous or a polymeric film material and may be, although they need not necessarily be, an elastic material. Suitable fibrous gatherable webs may utilize any suitable natural and/or synthetic fibers, for example, woven or nonwoven webs of fibers made of acrylic polymers, polyester, polyamide, glass, polyolefins, e.g., polyethylene and polypropylene, cellulosic derivatives such as rayon, cotton, silk, wool, pulp, paper and the like, as well as blends or combinations of any two or more of the foregoing. The gatherable webs may also comprise polymeric film layers such as polyethylene, polypropylene, polyamide, polyester, acrylic polymers, and compatible mixtures, blends and copolymers thereof.

The outer cover 16 may be liquid pervious, permitting liquids to readily penetrate into its thickness, or impervious, resistant to the penetration of liquids into its thickness. Outer cover 16 may be made from a wide range of materials, such as natural fibers (e.g. wood or cotton fibers), synthetic fibers (e.g. polyester or polypropylene fibers) or from a combination of natural and synthetic fibers or reticulated foams and apertured plastic films. The outer cover 16 may be woven, nonwoven or film such as spunbonded, carded, or the like. A suitable outer cover 16 is carded, and thermally bonded by means well known to those skilled in the fabric art. Alternatively, the outer cover 16 is derived from a spunbonded web. In a preferred embodiment, the outer cover is spunbonded polypropylene nonwoven, meltblown polypropylene nonwoven and spunbonded polypropylene nonwoven laminate (SMS). The total basis is about 0.6 osy and is made with about 86% spunbonded nonwoven and 14% meltblown nonwoven. A pigment such as titanium dioxide may be incorporated into the outer cover 16 and body side liner 18. Such spunbonded meltblown nonwoven laminate material is available from Kimberly-Clark Corporation, Roswell, Ga. The basis weight of the SMS material may vary from about 0.4 to about 1.0 osy.

In other preferred embodiments, the outer cover is spunbonded polypropylene nonwoven with a wireweave bond pattern having a grab tensile of 19 pounds as measured by ASTM D1682 and D1776, a Taber 40 cycle abrasion rating of 3.0 as measured by ASTM D1175 and Handle-O-Meter MD value of 6.6 grams and CD value of 4.4 grams using TAPPI method T402. Such spunbonded material is available from Kimberly-Clark Corporation, Roswell, Ga. The outer cover 16 has a weight of from about 0.3 oz. per square yard (osy) to about 1.5 osy, preferably about 0.7 osy.

The outer cover 16 may be constructed of a single spunbonded polypropylene nonwoven web having a basis weight of about 0.3 oz/yd$^2$ (10.2 gsm) to about 1.5 oz/yd$^2$ (51 gsm). In the top structure, the backsheet preferably comprises a material having a basis weight of from about 0.3 oz/yd$^2$ (10.2 gsm) to about 1.5 oz/yd$^2$ (51 gsm). Lesser basis weights may be used in the other regions of the article. Since the garment is typically intended for active wear, an exposed backsheet or portions thereof, can be made of materials or of a basis weight which is abrasion resistant.

The bodyside liner 18 may be any soft, flexible, porous sheet which passes fluids therethrough. Again, the liner must permit submersion in fresh water or salt water or treated water (chlorinated or bromated) and still retain its integrity. The bodyside liner 18 may comprise, for example, a nonwoven web or sheet of a spunbonded, meltblown or bonded-carded web composed of synthetic polymer filaments, such as polypropylene, polyethylene, polyesters or the like, or a web of natural polymer filaments such as rayon or cotton. The bodyside liner 18 has a pore size that readily allows the passage therethrough of liquids, such as urine and other body exudates. The bodyside liner 18 may be selectively embossed or perforated with discrete slits or holes extending therethrough. Optionally, the web or sheet may be treated with a surfactant to aid in liquid transfer. One suitable bodyside liner material is a wettable spunbonded polypropylene web produced by the methods and apparatus described in U.S. Pat. No. 4,340,563 issued Jul. 20, 1982, and U.S. Pat. No. 4,405,297 issued Sep. 23, 1983, to Appel et al., which are incorporated herein by reference. Bodyside liner 18 is liquid permeable and is a spunbonded polypropylene nonwoven web having a basis weight of about 0.6 osy (20.3 gsm). Suitable adhesives for adhering the laminate layers can be obtained from Findley Adhesives, Inc. of Wauwatosa, Wis.

The outer cover 16 and bodyside liner 18 may be further dyed or imprinted with any suitable color. Desirably, the bodyside liner 18 is either dyed or printed with a material which does not irritate the wearer's skin or bleed the color onto the skin.

Materials suitable for use as the elastics include a wide variety, but not limited to, elastic threads, yarn rubber, flat rubber (e.g. as bands), elastic tape, film-type rubber, polyurethane, and tape-like elastomer, or foam polyurethane or formed elastic scrim. Each elastic may be unitary, multipart, or composite in construction. Threads or ribbons, where used, may be multiple and may be applied as a composite. The elastomerics used in the elastics may be latent and nonlatent.

Preferably, the body elastics are elongated to between about 50% to about 300%, preferably depending on the decitex of the elastic threads used to about 150%. The elongations may vary for separate elements and still be within the overall elongation for the composite of elastic elements.

As illustrated most clearly in FIG. 1, the end portions of top 10 may be bonded together in the finished top to form a non-refastenable seam 30. The non-refastenable seam 30 may be formed by any suitable means such as ultrasonic sealing, adhesive bonding, heat sealing, or the like. One suitable method of forming such seams is disclosed in U.S. Pat. No. 4,938,753 issued Jul. 3, 1990, to Van Gompel et al., which is incorporated herein by reference.

The top 10 structure material desirably has stretch characteristics in a first direction such that it is capable of from about 10 to about 500 percent elongation and upon release of tension will recover at least 55 percent of its elongation. It is generally preferred that the top 10 structure material in the first direction be capable of between about 50 and about 300 percent elongation, particularly at least 125 percent elongation and recovery upon release of tension of at least 80 percent of its elongation.

As described previously, the top 10 may be formed of a material capable of stretching in one direction or capable of stretching in at least two substantially perpendicular directions. One suitable one-directional stretch material is disclosed in U.S. Pat. No. 4,720,415 issued Jan. 19, 1988, to Vander Wielen et al., which is incorporated herein by reference. The one-directional stretch material may comprise a composite material including at least one gatherable web bonded to at least one elongated elastic web. The elastic web may be an elastic film or nonwoven fibrous elastic webs such as meltblown elastomeric fibrous webs. In one embodiment, the top 10 comprises a stretch bonded laminate formed of a prestretched elastic meltblown inner layer sandwiched between and attached to a pair of spunbond polypropylene nonwoven webs having a basis weight of about 0.4 oz/yd$^2$ (13.6 gsm). Suitable elastic materials can be purchased from the Shell Chemical Company of Houston, Tex. under the trade name Kraton. Other suitable one-directional stretch materials are disclosed in U.S. Pat. No. 4,606,964 issued Aug. 19, 1986, to Wideman and U.S. Pat. No. 4,657,802 issued Apr. 14, 1987, to Morman.

Suitable two-directional stretch materials for the body elastics 20 are disclosed in U.S. Pat. No. 5,114,781 issued May 19, 1992, and U.S. Pat. No. 5,116,662 issued May 26, 1992, to Morman, which are incorporated herein by reference. A two-directional stretch material may comprise a composite material including a neckable material and an elastic sheet, which may be formed by meltblowing or extrusion. Neckable materials are those which may be constricted in at least one dimension by applying a tensioning force in a direction perpendicular to the desired direction of neck-down, and may include a spunbonded, meltblown or bonded carded web. The tensioned, necked neckable material may be joined to the elongated elastic sheet at spaced locations arranged in a nonlinear configuration. Another two-directional stretch composite material may comprise one or more layers of reversibly necked material joined to one or more layers of elastic sheet at spaced locations. Reversibly necked materials are those that have been treated, such as with heat, while necked to impart memory to the material so that, when a force is applied to extend the material to its pre-necked dimensions, the treated, necked portions will generally recover to their necked dimensions upon termination of the force.

Desirably, the material stretches in horizontal direction only, that is, around the body. If the material is elastic in both directions, it is desirable to limit the stretch in the vertical direction to less than about 20% under normal tensions.

Alternately, the body elastics 20 may be formed of a dry-spun coalesced multifilament elastomeric thread sold under the tradename LYCRA and available from I. E. Du Pont de Nemours and Company. Still alternately, the elastics may be formed of other typical elastics utilized in the diaper-making art, such as a thin ribbon of elastic material as disclosed in U.S. Pat. No. 4,940,464 issued Jul. 10, 1990, to Van Gompel et al., which is incorporated herein by reference. Elasticity could also be imparted to the top 10 structure material by extruding a hot melt elastomeric adhesive between the outer cover 16 and the bodyside liner 18. Other suitable elastic gathering means are disclosed in U.S. Pat. No. 4,938,754 to Mesek and U.S. Pat. No. 4,388,075 to Mesek et al.

In forming the top 10 structure material, the body elastics 20 may be individually laid on one of the adjacent gatherable layers (outer cover 16 or bodyside liner 18) and the other gatherable layer web applied over the elastics to bond the first layer. Alternatively, only one gatherable layer, e.g., the outer cover 16, may be employed and the inside of the outer cover 16 and elastics may be left exposed on one side.

Although the garment of this invention is generally intended to be disposable, a garment which is reusable may take advantage of this invention. Thus, both reusable and disposable items (the latter term meaning items intended to be discard after a single use rather than being laundered and reused) are provided by the present invention.

The foregoing detailed description has been for the purpose of illustration. Thus, a number of modifications and changes may be made without departing from the spirit and scope of the present invention. For instance, alternative or optional features described as part of one embodiment can be used to yield another embodiment. Therefore, the invention should not be limited by the specific embodiments described, but only by the claims.

EXAMPLE

The material used to obtain this example consists of a laminate made of 2 facings of 0.6 osy nonwoven material covering 470 decitex LYCRA elastic strands placed at about 7 strands per inch width of material. The elastic strands are adhesively attached using an add-on of 5 gsm. The elastics are also applied at 150% to 170% stretch. The width of the final laminate is 4 inches, excluding any nonelasticized ruffle that is added. The ruffle is formed on the edge of the material by eliminating the elastic strands and allowing the 2 nonwoven facings to be bonded adhesively together, then slitting to the desired ruffle width. The nonwoven used in this case was a 0.6 osy spunbond/meltblown/spunbond laminate (SMS), although other nonwoven facings (i.e. 0.4 and 0.6 osy spunbond) have shown similar results. In addition, the elastic strands decitex and spacing, the adhesive add-on and the percent stretch may also vary. The codes tested are as follows:

Code A: 4.0" SMS/elastic strand laminate with no ruffle

Code B: 4.0" SMS/elastic strand laminate with 0.25" ruffle

Code C: 4.0" SMS/elastic strand laminate with 0.50" ruffle

Code D: 4.0" SMS/elastic strand laminate with 0.75" ruffle

Code E: 4.0" SMS/elastic strand laminate with 1.0" ruffle (preferred design)

Code F: 5.25" SMS/elastic strand laminate with no ruffle (this code was tested to eliminate the effect of sample width on the data).

Samples of each code are cut to at least 18" in length (this provides for a testing length of 16", the approximate length needed to make a swimsuit top) and an inch on either side for attachment to the test template. The center of the width of each sample is determined as between the two outermost strands of elastics strands and a line is drawn down the entire center length of the sample. The ruffle width is not included in the measurement.

A piece of foam core or cork board is marked at 0", 16", 20" and 21.5". The 20" and 21.5" marks represent the 16" sample pulled to 25% and 35% respectively, which is the typical amount of stretch the material demonstrates when worn by a typical child.

Using a pin, one end of the material is attached into the board at the 0" mark. Taking care to lay the material flat and straight, but without any elongation, pin through the second end of the material is attached into the board at the 16" mark. Once the material is attached, the end of the material at the 16" mark is stretched to 20" by removing the pin from the board and using the pin to pull the material to the 20" mark. Any wrinkles are smoothed out around the pin and the sample is allowed to sit for 5 minutes.

After waiting for 5 minutes, the amount of curling of the lengthwise edges of the material is measured. This is accomplished with an inverted U-shaped clear template (approximately 2.0" high by 6.0" wide and 6.0" long) with a line drawn lengthwise at the centerline of the template. When placed over the sample, the centerline of the template should be directly over the centerline of the sample. In addition, the edge of the template (start of the centerline) should be placed at the exact center of the length of the sample (a line drawn of the board prior to testing to mark this point). Measurement of amount of curl is accomplished by placing the U-shaped template over the sample so that the centerline of the template is directly above the centerline of the sample. Once the template is in place, measure the distance (in mm) from the centerline to each edge of the material and record. If the material has curled over enough to cover the centerline of the sample, the distance past the centerline should be added as well. In addition, it should be noted whether the material edge has just curled or has actually begun to fold over. After recording the measurements, the results for the ruffled material should be adjusted to take into account the width of the ruffle. This is accomplished by subtracting the width of the ruffle from the respective results of materials with ruffles.

After the measurements are complete at 25% stretch, the material is then pulled to the 21.5 inch mark (35% elongation) using the pin again. The measurements of curl-over are taken as described above and recorded. The results are shown in the Table below and illustrated in FIGS. 3–6.

Figure 4:
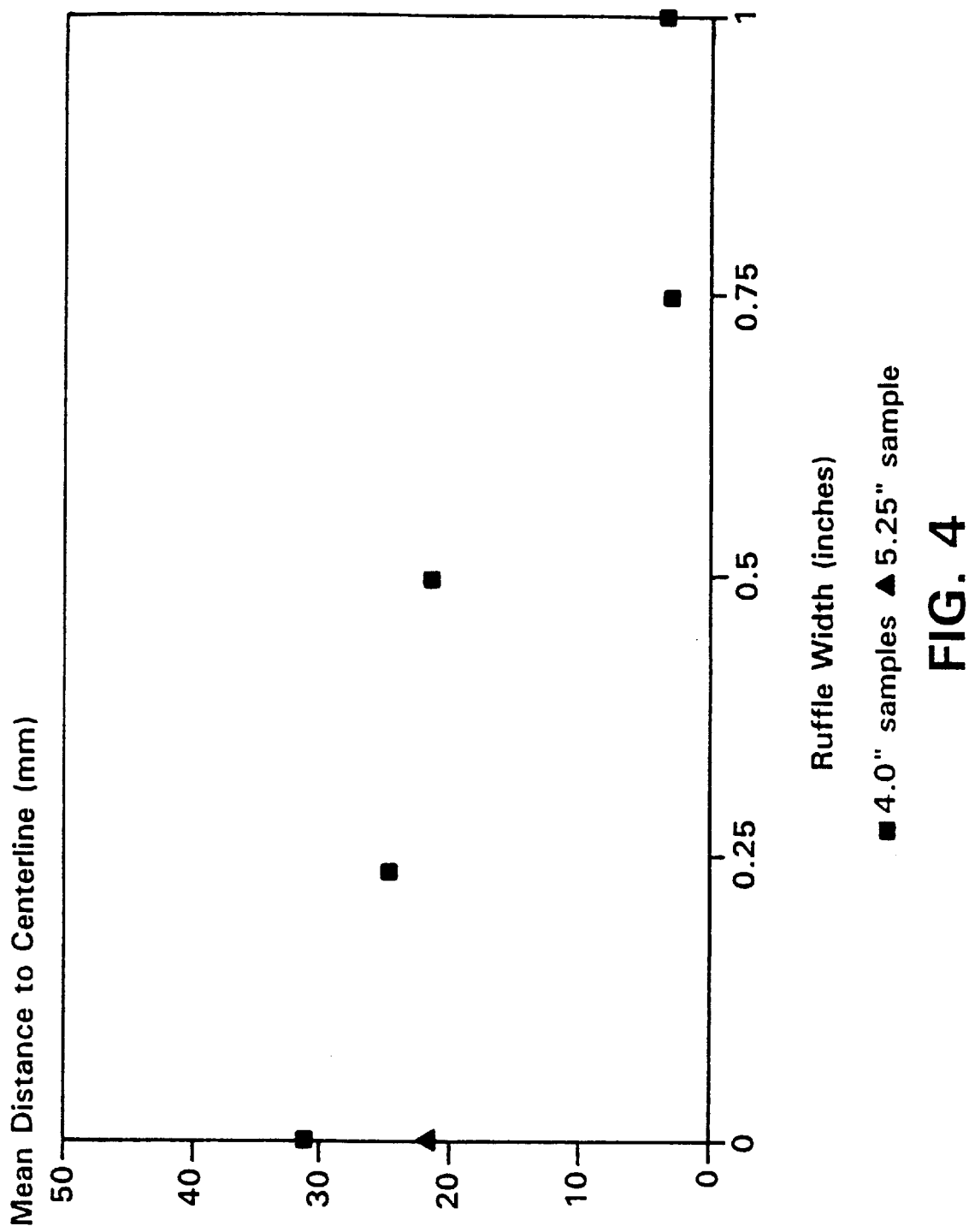
FIG. 4 is a chart showing curl over for no ruffle and 35% stretch.
Figure 5:
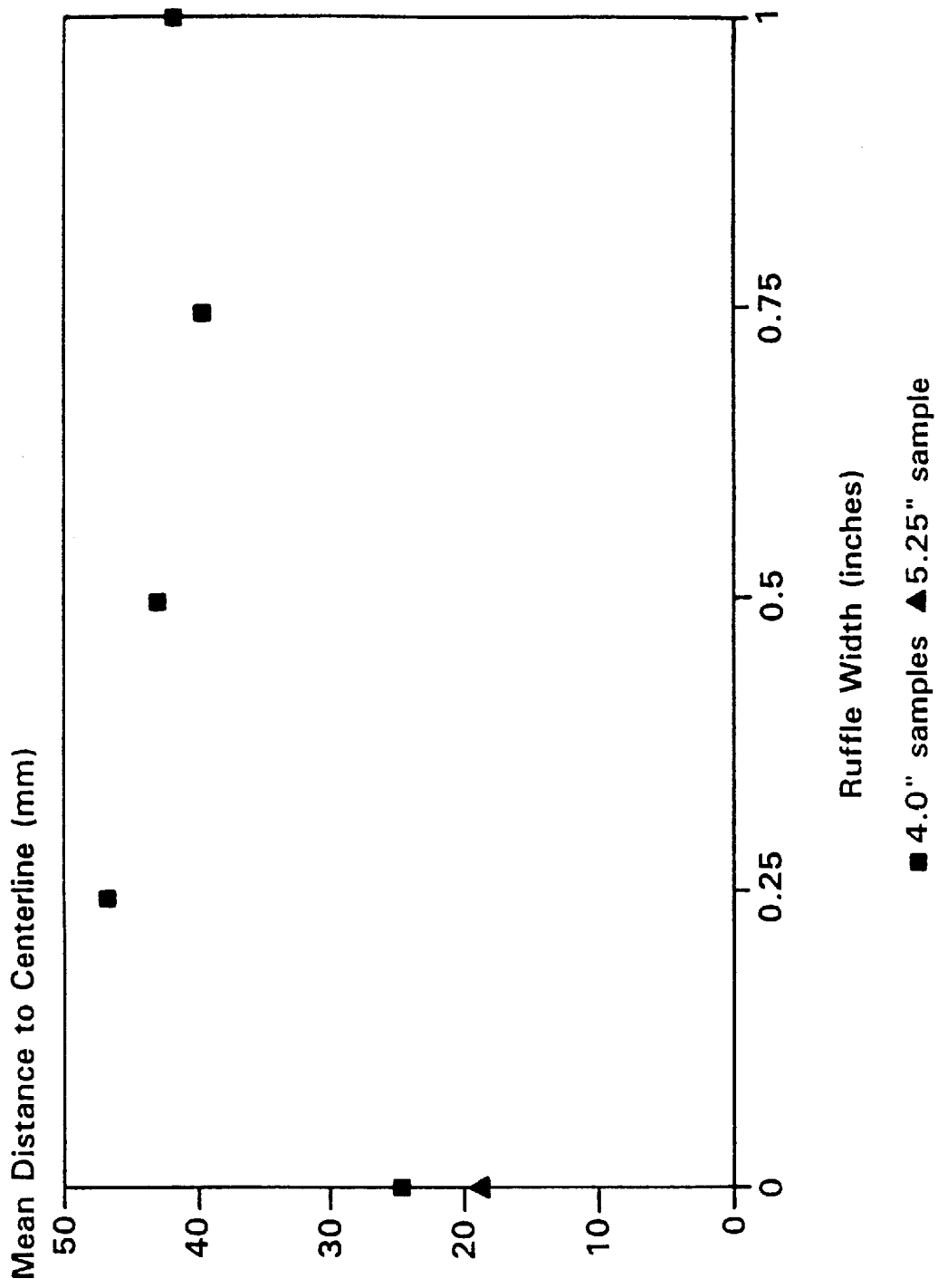
FIG. 5 is a chart showing curl over for the ruffle of this invention and 25% stretch.
Figure 6:
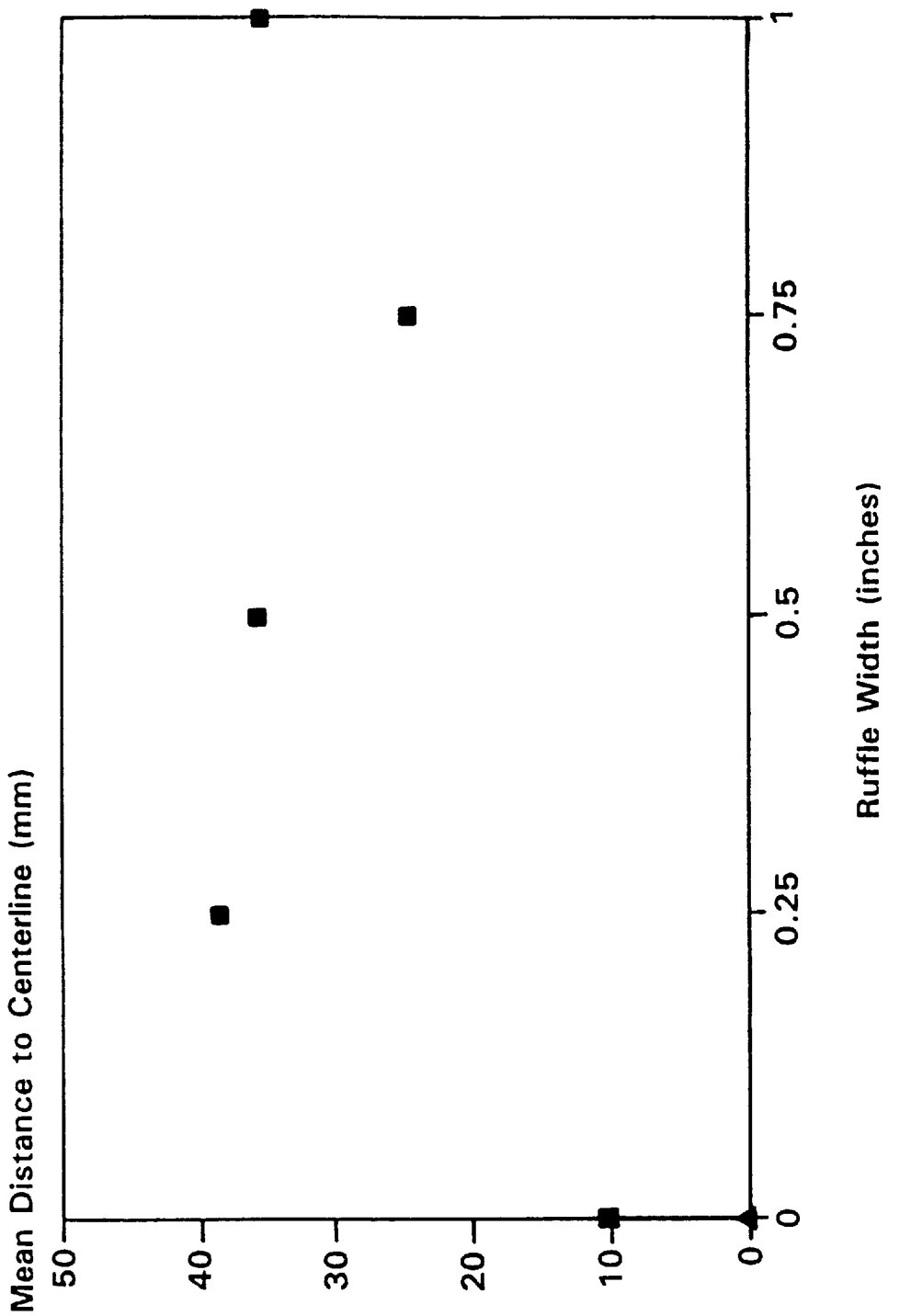
FIG. 6 is a chart showing curl over for the ruffle of this invention and 35% stretch.

The test results are shown Table 1. From the test results, FIG. 3 was prepared showing curl over for the material with no ruffles and 25% stretch. FIG. 4 shows curl over for no ruffle and 35% stretch. FIG. 5 is a chart showing curl over for ruffles of 0.25, 0.5, 0.75 and 1.00 inch at 25% stretch. FIG. 6 is a chart showing curl over for ruffles of 0.25, 0.50, 0.75 and 1.0 inch at 35% stretch. Improvement is shown for each width of ruffle in comparison to the materials lacking a ruffle.

DISTANCE FROM EDGE ELASTOMERIC STRAND TO LAMINATE CENTERLINE
(mm)

| Sample | Ruffle Width (in) | Side | Percent Stretch | SAMPLE NUMBER 1 | 2 | 3 | 4 | 5 | Mean Distance (mm) |
|---|---|---|---|---|---|---|---|---|---|
| 1 | 0.00 | A  | 25 | 40.00  | 35.00 | 38.00 | 46.00 | 37.00 | 39.2 |
| 1 | 0.00 | Aa | 25 | 20.00  | 23.00 | 30.00 | 18.00 | 33.00 | 24.8 |
| 1 | 0.00 | A  | 35 | 31.00  | 24.00 | 30.00 | 41.00 | 30.00 | 31.2 |
| 1 | 0.00 | Aa | 35 |  2.00  |  6.00 | 19.00 |  2.00 | 22.00 | 10.2 |
| 2 | 0.25 | A  | 25 | 40.00  | 48.00 | 48.00 | 49.00 | 52.00 | 47.4 |
| 2 | 0.25 | B  | 25 | 51.65  | 40.65 | 44.65 | 49.65 | 48.65 | 47.1 |
| 2 | 0.25 | A  | 35 | 12.00  | 18.00 | 35.00 | 29.00 | 30.00 | 24.8 |
| 2 | 0.25 | B  | 35 | 48.65  | 39.65 | 30.65 | 35.65 | 38.65 | 38.7 |
| 3 | 0.50 | A  | 25 | 49.00  | 46.00 | 46.00 | 50.00 | 44.00 | 47.0 |
| 3 | 0.50 | B  | 25 | 40.30  | 47.30 | 46.30 | 44.30 | 37.30 | 43.1 |
| 3 | 0.50 | A  | 35 | 25.00  | 28.00 | 25.00 | 13.00 | 16.00 | 21.4 |
| 3 | 0.50 | B  | 35 | 29.30  | 43.30 | 36.30 | 39.30 | 29.30 | 35.5 |
| 4 | 0.75 | A  | 25 | 18.00  | 30.00 | 35.00 | 31.00 | 22.00 | 27.2 |
| 4 | 0.75 | B  | 25 | 43.95  | 42.95 | 45.95 | 23.95 | 40.95 | 39.6 |
| 4 | 0.75 | A  | 35 | −10.00 |  0.00 | 13.00 |  3.00 |  8.00 |  2.8 |
| 4 | 0.75 | B  | 35 | 40.95  | 32.95 | 26.95 |  2.95 | 17.95 | 24.4 |
| 5 | 1.00 | A  | 25 | 30.00  | 20.00 | 21.00 | 34.00 | 18.00 | 24.6 |
| 5 | 1.00 | B  | 25 | 41.60  | 42.60 | 37.60 | 44.60 | 42.60 | 41.8 |
| 5 | 1.00 | A  | 35 |  7.00  | −5.00 | −5.00 | 17.00 |  2.00 |  3.2 |
| 5 | 1.00 | B  | 35 | 38.60  | 44.60 | 30.60 | 27.60 | 34.60 | 35.2 |
| 6 | 0.00 | A  | 25 | 36.00  | 29.00 | 35.00 | 33.00 | 45.00 | 35.6 |
| 6 | 0.00 | Aa | 25 | 21.00  | 33.00 |  9.00 | 19.00 | 15.00 | 19.4 |
| 6 | 0.00 | A  | 35 | 15.00  |  7.00 | 35.00 | 28.00 | 23.00 | 21.6 |
| 6 | 0.00 | Aa | 35 |  0.00  | 15.00 | −8.00 | −5.00 |  0.00 |  0.4 |

What is claimed is:

1. A garment for wearing about the body, comprising body covering assembly having an upper body opening and lower body opening, each opening having an edge about its perimeter, the body covering assembly comprising a relatively elastic region between the upper edge and a lower edge region, and a lower edge region between the relatively elastic region and the lower edge, the lower edge region being relatively inelastic compared to the relatively elastic region; the lower edge region further being from about 0.25 to about 2.0 inches in width.

2. The garment of claim 1, wherein the lower edge region is about 1.0 inch in width.

3. The garment of claim 1, comprising an outer cover and a bodyside liner, both of which cover a series of body elastics which circumferentially surround the body to form the relatively elastic region.

4. The garment of claim 3, wherein the outer cover is a gatherable material.

5. The garment of claim 4, wherein the outer cover is a woven material.

6. The garment of claim 4, wherein the outer cover is a nonwoven material.

7. The garment of claim 4, wherein the outer cover is a fibrous material.

8. The garment of claim 4, wherein the outer cover is a polymeric film material.

9. The garment of claim 3, wherein the outer cover is an elastic material.

10. The garment of claim 7, wherein the outer cover fibrous material comprises a component material selected from the group consisting of acrylic polymer, polyester, polyamide, glass, polyethylene, polypropylene, rayon, cotton, silk wool, pulp, and paper.

11. The garment of claim 8, wherein the outer cover polymeric film material comprises a component material selected from the group consisting of acrylic polymer, polyester, polyamide, polyethylene, and polypropylene.

12. The garment of claim 3, wherein the outer cover is a laminate of (1) spunbonded polypropylene nonwoven material, (2) meltblown polypropylene nonwoven material and (3) spunbonded polypropylene nonwoven material.

13. The garment of claim 3, wherein the bodyside liner is a soft, flexible porous sheet which (1) permits submersion in fresh water, salt water, chlorinated water or brominated water, and (2) thereafter retains its integrity.

14. The garment of claim 3, wherein the bodyside liner comprises a nonwoven spunbonded web composed of filaments selected from the group consisting of (i) polypropylene, (ii) polyethylene, (iii) polyester, (iv) rayon, and (v) cotton filaments.

15. The garment of claim 3, wherein the body elastics are elastic threads, yarn rubber, flat rubber, elastic tape, polyurethane elastic, or foamed elastic scrim.

16. The garment of claim 3, wherein the body elastics are elongated to between about 50% and about 300%.

17. The garment of claim 3, wherein the body covering assembly is made of materials having stretch characteristics such that the body covering assembly is capable of between about 50% and about 300% elongation, and recovery, upon release of tension, of at least 80% of its elongation.

18. The garment of claim 3, wherein the body covering assembly is made of materials capable of stretching in one direction.

19. The garment of claim 3, wherein the body covering assembly is made of materials capable of stretching in two substantially perpendicular directions.

20. The garment of claim 7, wherein the outer cover fibrous material comprises a blend of two or more materials of the group consisting of acrylic polymer, polyester, polyamide, glass, polyethylene, polypropylene, rayon, cotton, silk, wool, pulp, and paper.

21. The garment of claim 7, wherein the outer cover fibrous material comprises a combination of two or more materials of the group consisting of acrylic polymer, polyester, polyamide, glass, polyethylene, polypropylene, rayon, cotton, silk, wool, pulp, and paper.

22. The garment of claim 8, wherein the outer cover polymeric film material comprises a compatible mixture of two or more polymers of the group consisting of acrylic polymer, polyester, polyamide, polyethylene, and polypropylene.

23. The garment of claim 8, wherein the outer cover polymeric film material comprises a compatible blend of two or more polymers of the group consisting of acrylic polymer, polyester, polyamide, polyethylene, and polypropylene.

24. The garment of claim 8, wherein the outer cover polymeric film material comprises a compatible copolymer of two or more types of monomeric units of the group consisting of acrylic, ester, amide, ethylene, and propylene units.

25. The garment of claim 3, wherein the bodyside liner comprises a nonwoven meltblown web composed of filaments selected from the group consisting of (i) polypropylene, (ii) polyethylene, (iii) polyester, (iv) rayon, and (v) cotton filaments.

26. The garment of claim 3, wherein the bodyside liner comprises a nonwoven bonded-carded web composed of filaments selected from the group consisting of (i) polypropylene, (ii) polyethylene, (iii) polyester, (iv) rayon, and (v) cotton filaments.

* * * * *